Oct. 20, 1931.   L. C. HARDESTY   1,828,564
SYSTEM OF MOTOR CONTROL
Filed Feb. 26, 1929

Inventor:
Llewellyn C. Hardesty,
by Charles V. Tullar
His Attorney.

Patented Oct. 20, 1931

1,828,564

UNITED STATES PATENT OFFICE

LLEWELLYN C. HARDESTY, OF SCOTIA, NEW YORK, ASSIGNOR TO GENERAL ELECTRIC COMPANY, A CORPORATION OF NEW YORK

SYSTEM OF MOTOR CONTROL

Application filed February 26, 1929. Serial No. 342,749.

This invention relates to system for controlling the operation of electric motors, more particularly to reversing control system for a motor employed in driving large rotating masses such for example as the rolls of a rubber mill, and has for an object the provision of a simple and reliable system of the kind in which the motor may be quickly started, stopped, and reversed in a reliable and efficient manner.

In carrying my invention into effect in one form thereof, I provide reversing contactors, master switches for controlling the contactors for forward and reverse rotation of the motor, and for stopping the motor, the arrangement being such that the reversal operation is accomplished by plugging the motor, and operation of the stop switch effects stopping of the motor by plugging, irrespective of its direction of rotation.

Figure 1:
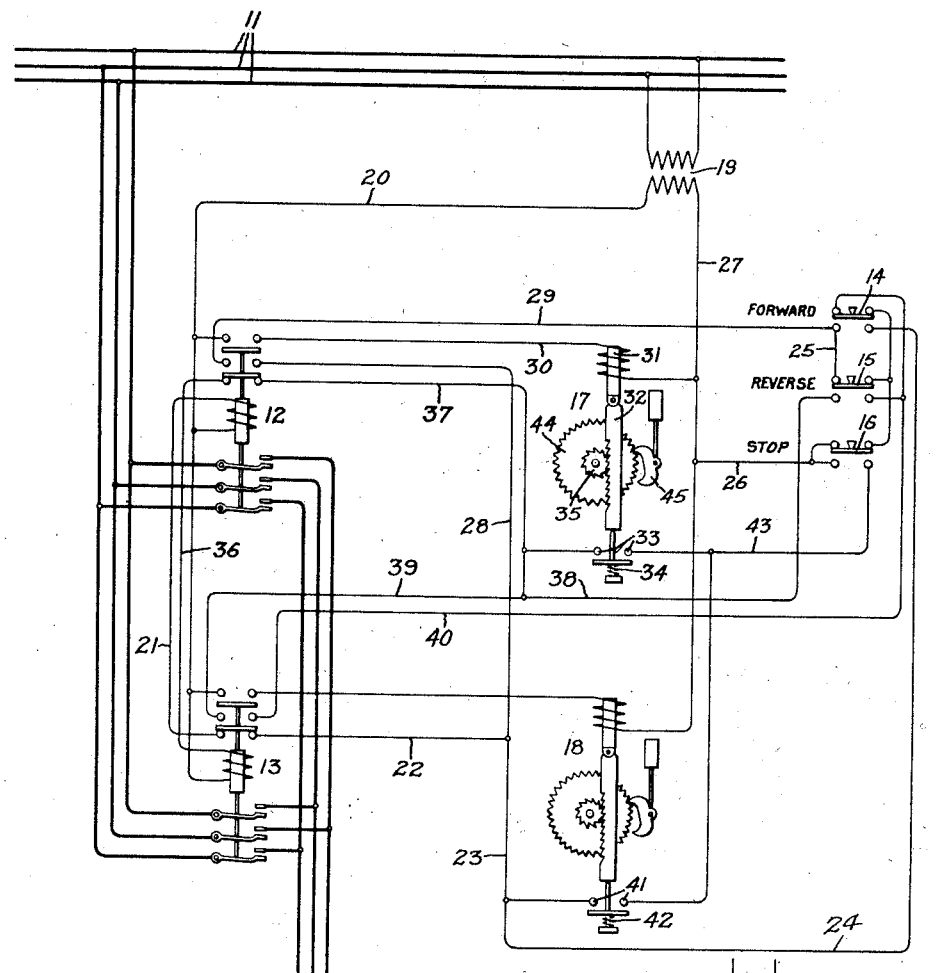
Figure 2:
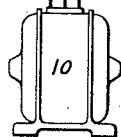
Figure 2:
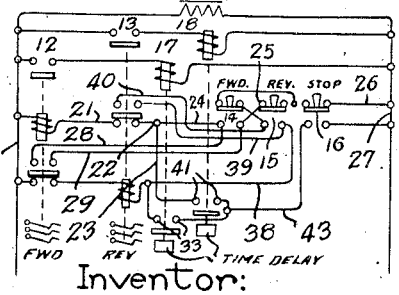

For a better and more complete understanding of the invention, reference should be had to the following specification and to the accompanying drawings in which Fig. 1 is a diagrammatical representation of an embodiment of my invention; and Fig. 2 is a simplified "across the line" diagram of the control circuits of Fig. 1.

Referring now to the drawings, in which for the purposes of illustration the invention is shown as embodied in an alternating current system, a suitable alternating current motor 10 is connected to be supplied from a source of electric power represented by the three phase supply lines 11, through the contacts of either a forward contactor 12, or a reverse contactor 13.

The operation of the contactors is controlled by suitable master switch mechanism represented in the drawings by the manually operated "forward", "reverse", and "stop" push buttons 14, 15, and 16 respectively. The forward and reverse push buttons are each provided with normally open and normally closed contacts respectively, and each serves when depressed momentarily to bridge the normally open contacts to close its respective contactor 12 or 13 as the case may be. Stop button 16 is likewise provided with normally open and normally closed contacts. In its depressed position this button serves to deenergize and open whichever of the two reversing contactors that may be closed at the time, and if maintained depressed performs the additional function of closing that reversing contactor that is open at the time thereby plugging the motor and bringing it speedily to rest.

Definite time delay devices 17 and 18 of any suitable construction are respectively associated with forward and reverse contactors 12 and 13. The operation of these time delay devices is controlled in accordance with the operation of the reversing contactor with which it is associated, and in its operated position each serves partially to establish an energizing circuit from the normally open contacts of the stop button 16 to the coil of the reversing contactor with which it is not associated. The secondary of a small transformer 19, the primary of which is connected to one phase of the supply lines 11 supplies the control circuits with the energy necessary to their operation.

With the above preliminary understanding of the system, the complete operation which will now be described will be readily understood. With the apparatus in its normal or prestarting position as shown in the drawings, depression of the forward button 14 to bridge its normally open contacts establishes an energizing circuit for the forward contactor 12 that extends from the left hand side of the secondary of transformer 19 over conductor 20, through the coil of forward contactor 12, conductor 21, lower auxiliary contacts of reverse contactor 13, conductors 22, 23, and 24, lower contacts of forward button 14, conductor 25, upper contacts of reverse button 15, upper contacts of stop button 16, conductors 26 and 27 to the right hand side of transformer 19. Contactor 12 closes in response to the energization of its coil and establishes power connections from the supply lines 11 to the motor 10 for the forward direction of rotation. Contactor 12 in closing establishes a holding circuit for its own coil independently of forward button 13, and an energizing circuit for the coil of time delay device 17.

The holding circuit proceeds from transformer 19 to conductor 22 as before, and thence over conductor 28, intermediate auxiliary contacts of the lower movable auxiliary contact member in its upper position, conductors 29 and 25, normally closed contacts of buttons 15 and 16 in series, conductors 26 and 27 to transformer 19. The energizing circuit for time delay device 17 extends from the left hand side of transformer 19 over conductor 20, through upper auxiliary contacts of contactor 12, by conductor 30 to and through the coil of time delay device 17 to conductor 27 and back to transformer 19.

It should be noted that each time delay device comprises a rack member 32 pivotally suspended from armature member 31 and provided with one way teeth which engage similarly shaped teeth on ratchet wheel 35, which permits unobstructed upward movement of the armature in response to energization of the coil thus releasing contact 33 and enabling it to engage its stationary contacts in obedience to the bias of spring 34. This time delay device is described and claimed in a copending application of Robert W. Goff, Serial No. 161,919 filed January 18, 1927, assigned to the same assignee as this invention.

Should it be desired to reverse the direction of rotation of the motor, it is only necessary to depress reverse button momentarily, the effect of which is to open the holding circuit for forward contactor 12 permitting it to fall down, and to establish an energizing circuit for reverse contactor 13 that may be traced from the transformer 19 over conductor 20, through the coil of reverse contactor 13, conductor 36, lower auxiliary contact of forward contactor 12, conductors 37 and 38, lower contacts of reverse button 15, normally closed contacts of buttons 14 and 16 in series, conductors 26 and 27 to transformers 19.

As in the case of contactor 12, the closing of contactor 13 establishes a self-holding circuit for its coil, which is independent of reverse button 15, and an energizing circuit for time delay device 18. The former circuit may be traced as before from transformer 19 to conductor 37 and thence over conductor 39, lower auxiliary contact of contactor 13 in its upper position, conductor 40, normally closed contacts of buttons 14 and 16 in series, conductors 26 and 27 to transformer 19. The energizing circuit for the time delay device is traced from conductor 20 to conductor 27 through the upper auxiliary contacts of reverse contactor 13. Time delay device 18 responds immediately permitting its contacts 41 to be closed by the spring 42. Thus it will be observed that the motor is reversed by "plugging", that is to say by immediately applying full voltage to its terminals for the reverse direction of rotation.

As a result the motor is brought to rest from the forward direction of rotation and accelerated to full speed in the reverse direction in the minimum time possible. It will also be observed that the direction of rotation may be changed as many times as desired by depressing the appropriate forward or reverse button as the case may be, and that the reversal is always accomplished by "plugging" the motor.

Assuming that after a number of reversals it is desired to stop the motor, and that the direction of rotation is forward, with the forward contactor 12 and time delay device 17 in their closed positions as explained above, depression of stop button 16 opens the holding circuit of contactor 12, permitting it to fall down, and establishes an energizing circuit for reverse contactor 13 that extends from transformer 19 to conductor 37 as before, thence through the contact 33 of time element device 17, conductor 43, stop button 16, and conductors 26 and 27 to transformer 19. Contactor 13 will close in response to the energization of its coil and apply full voltage to the terminals of motor 10 for the reverse direction of rotation, thereby applying a powerful braking torque and bringing it quickly to rest. The stop button 16 must be maintained depressed to keep contactor 13 closed.

Operation of the time delay device 17 is initiated by the opening of contactor 12 which deenergizes the coil of time delay device 17 to permit the weighted rack 32 to descend under the attraction of gravity. The descent of rack 32 is retarded by ratchet wheel 35 with which it meshes, and which in turn drives an escapement wheel 44, the speed of rotation of which is regulated by timed pendulum escapement latch 45. At the end of a predetermined time which is preferably just sufficient to permit the motor 10 to come to rest after applying reverse power connections, the rack 32 opens contact 33, deenergizing contactor 13 and interrupting the power connections to the motor.

Likewise, as will be understood by those skilled in the art, if the motor is rotating in the reverse direction when the stop button is depressed the contactor 13 will be opened, and the forward contactor 12 energized through contact 41 of time relay device 18, and closed, and finally opened again after the expiration of a predetermined interval of time.

What I claim as new and desire to secure by Letters Patent of the United States, is:

1. A system of motor control comprising a motor, means for establishing running connections for said motor for both directions of rotation, a stop device and means controlled thereby for interrupting said running connections and establishing plugging connections irrespectively of the previous direction of rotation, and time element means controlled by said stop means for opening said plugging connections after a predetermined interval.

2. A system of motor control comprising a motor, means for starting and reversing said motor for forward and reverse operation including means for establishing plugging connections upon reversal of said motor, a control device and means controlled thereby for establishing plugging connections for both directions of rotation to stop said motor, and time element means set in operation in response to operation of said control device for opening the plugging connections established by said stop means a predetermined interval of time after establishment thereof.

3. In combination, a motor, means for reversing said motor including forward and reverse buttons and respective forward and reverse contactors controlled thereby, a separate time element device associated with each of said contactors and operable in response to the operation thereof, a stop button and means including energizing circuits for said contactors under the control of said time element devices and said stop button for effecting plugging connections to stop said motor in response to continued depression of said stop button for the period of operation of one of said time element devices.

4. In a system of motor control, forward and reverse contactors, a stop button having normally closed and normally open contacts, an energizing circuit for one of said contactors including the normally closed contacts of said stop button, a time element device operable in response to the closing of one of said contactors partially to complete an energizing circuit for the other of said contactors from said normally open contacts whereby operation of said stop button to open said one contactor and stop said motor effects energizations of said other contactor for establishing reverse power connections during the operating period of said time element device.

5. In a system of motor control, a motor, forward and reverse contactors for reversing said motor, forward and reverse buttons respectively for said contactors and connections controlled thereby through which depression of one of said buttons when the motor is running effects plugging of said motor, a stop button for deenergizing said contactors, a time element device under the control of one of said contactors for completing an energizing circuit for the other of said contactors to the stop button, whereby continued depression of said stop button effects plugging of said motor for the period of operation of said time delay device by deenergizing one of said contactors and energizing the other.

6. In combination, a motor, forward and reverse contactors for reversing said motor, a forward button, a reverse button, and a stop button for controlling said contactors, a time element device associated with the forward contactor and a second time element device associated with the reverse contactor, connections controlled by said forward contactor in its closed position for operating its time element device to the closed position partially to complete an energizing circuit between said stop button and said reverse contactor, whereby continued depression of said stop button to open the forward contactor serves to close the reverse contactor for the period of operation of said time element device.

7. A motor control system comprising in combination a motor, forward and reverse contactors for reversing the direction of rotation of said motor, means comprising forward and reverse buttons and main energizing connections controlled thereby for operating said contactors, respective auxiliary energizing connections for each of said contactors, means comprising respective auxiliary contacts on each of said contactors and operable in the open position of each of said contactors for partially completing the auxiliary energizing circuit for the other of said contactors, a manually operated stop button for interrupting said energizing connections for one of said contactors and completing said auxiliary connections for the other of said contactors to plug said motor to rest irrespectively of its direction of rotation, and time element means operable in response to operation of said stop button for interrupting said auxiliary connections after a predetermined interval of time.

In witness whereof, I have hereunto set my hand this 25th day of February, 1929.

LLEWELLYN C. HARDESTY.